Sept. 27, 1960     J. H. FARRELL ET AL     2,954,003
MEANS FOR TRANSPORTATION OF LOW TEMPERATURE LIQUIDS
Filed Jan. 16, 1957     2 Sheets-Sheet 1
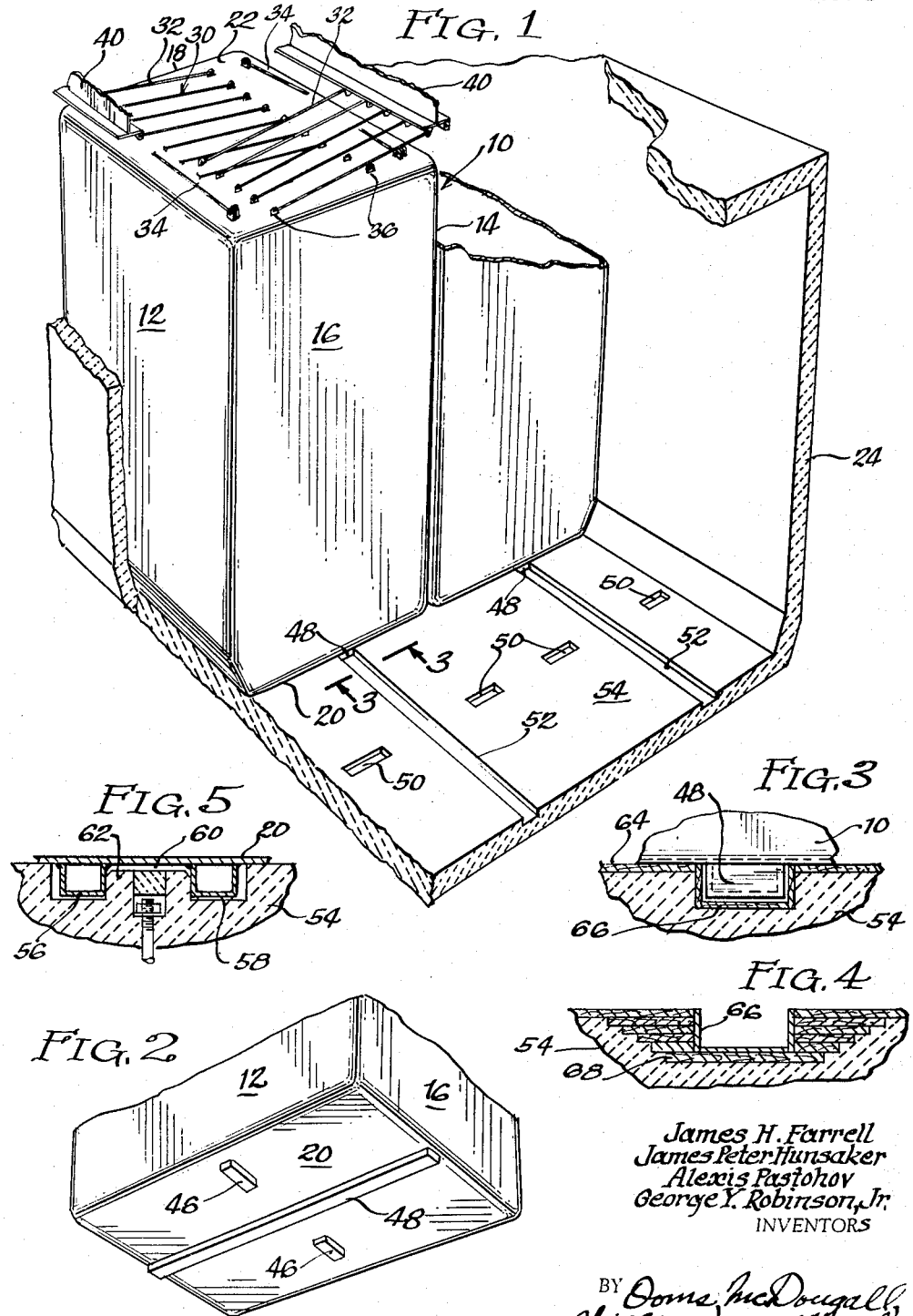
James H. Farrell
James Peter Hunsaker
Alexis Pastohov
George Y. Robinson, Jr.
INVENTORS
BY Ooms, McDougall,
Williams and Hersh
Attorneys

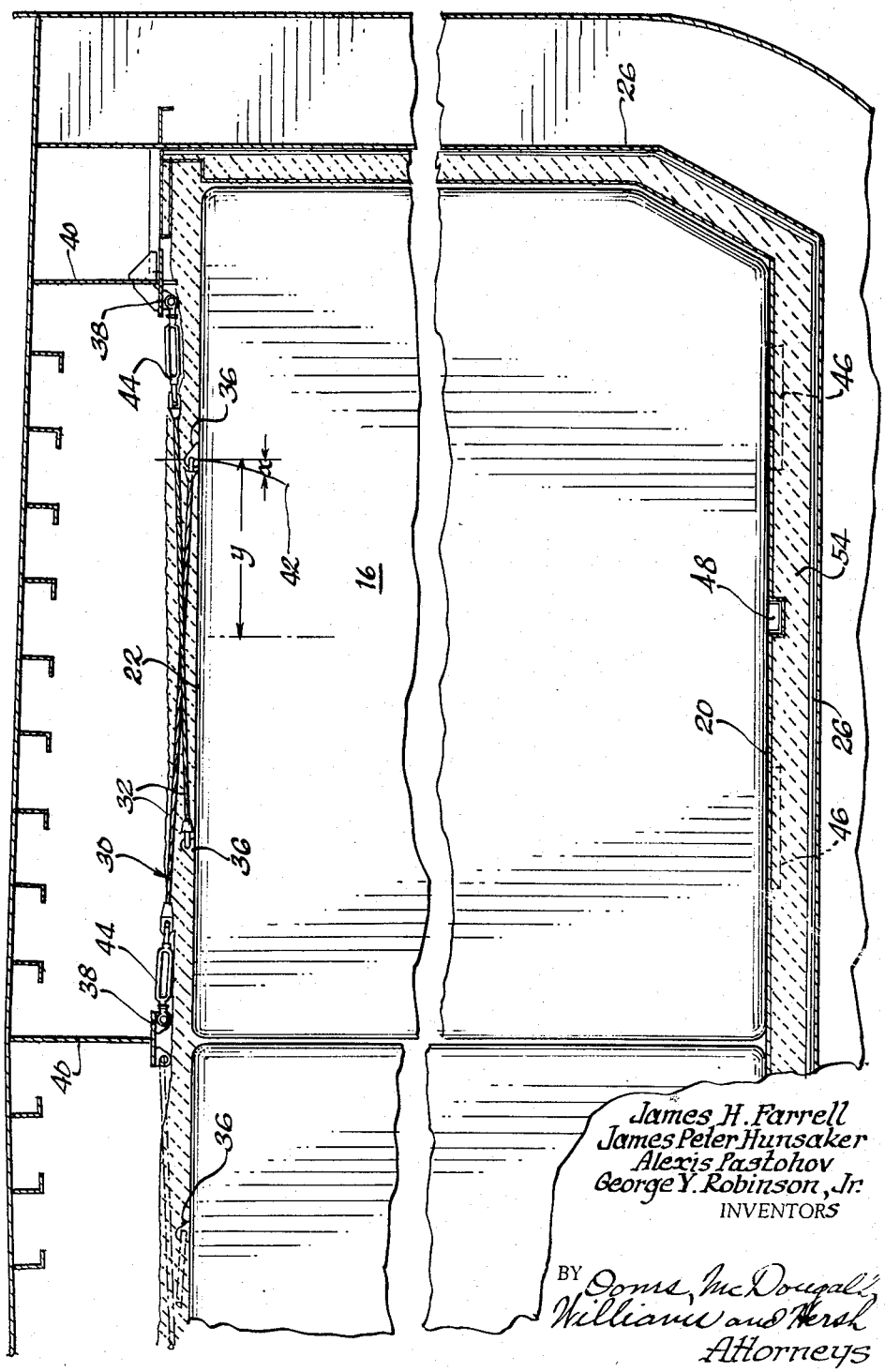

United States Patent Office 2,954,003
Patented Sept. 27, 1960

2,954,003

MEANS FOR TRANSPORTATION OF LOW TEMPERATURE LIQUIDS

James H. Farrell, Cambridge, James Peter Hunsaker, Milton, Alexis Pastuhov, Harvard, and George Y. Robinson, Jr., West Acton, Mass., assignors, by mesne assignments, to Conch International Methane Limited, a corporation of the Bahamas Filed Jan. 16, 1957, Ser. No. 634,571

9 Claims. (Cl. 114—74)

This invention relates to transportation means for shipment of a liquid in large volume, and it relates more particularly to a tank structure of large capacity and its support for on-ship transportation as a container which is substantially independent of the ship structure.

While the assembly forming the subject matter of this invention has general application to the transportation and shipment of any liquid in large volume in an independent container, it is addressed chiefly to a means for the shipment of large quantities of a liquefied hydrocarbon gas at low temperature, as represented by liquefied natural gas formed principally of methane having a boiling point of minus 250° F. at atmospheric pressure.

When transporting a material of the type described in large volume, it is essential to employ means for housing the liquid while at about atmospheric pressure, otherwise it would become a practical impossibility to design a container of such high volumetric capacity with sufficient strength to withhold the pressures which would otherwise become operative. Because of the low temperature conditions existing within the container, it is desirable further to maintain substantial separation between the cold from the liquid and the ship structure since the cold of the liquid would have deleterious effect on the steel walls and framework of the ship. This is to be distinguished from the usual practice of merely confining the liquid within the hull of an ocean-going oil tanker and the like. In addition, it is important further properly to insulate the container to minimize transfer of heat to the liquid contained therein to minimize loss, as by volatilization. The need for independence between the cargo container and the ship structure while simultaneously supporting the cargo container properly in shifting movement due to the motion of the ship, presents a new and novel problem.

The situation is still further aggravated by the fact that in the container, hereinafter referred to as a tank, housing the low temperature liquid, and particularly tanks which are not properly filled, changes take place in the dimensional characteristics of the tank by reason of the temperature drop before filling the tank and the temperature gradient that exists in unfilled portions of the tank. When liquid is introduced into the tank, temperature changes in the order of 260° F. can take place, causing considerable change in the dimensional characteristics of the tank. Thus there arises the problem of compensating for these dimensional changes in the tank while, at the same time, maintaining the tank in proper relation within the ship so that both the tank and the ship structure are fully and adequately protected from any possible damage which might otherwise be caused by the rolling or pitching of the ship or by stress relationships which might otherwise be introduced into the tank. Inasmuch as this has not been a problem in the case of normal tankers designed for carrying oil or other liquids at about ambient temperature, there has been no need to the present for providing tanks capable of carrying low temperature liquids in independent cargo containers on ship.

It is therefore an object of this invention to produce an independent cargo container which may be safely carried by a carrier which is subject to rolling or pitching.

Another object is to provide a cargo container for a low temperature liquid which embodies means to compensate for changes in dimension of the cargo container such as are brought about by temperature changes within the container.

A further object is to provide an independent cargo container and means for mounting the container in an ocean-going vessel, and it is a related object to produce a container of the type described which is adapted for use in the transportation of low temperature liquids without the development of undue thermal losses of liquid and without the build-up of dangerous stresses in either the vessel or container or elements associated therewith.

These and other objects and advantages of this invention will hereinafter appear and for purposes of illustration, but not of limitation, embodiments of the invention are shown in the accompanying drawings, in which—

Figure 1 is a perspective elevational view of a portion of the ship's hold showing the means embodied in the practice of this invention for mounting the container;

Figure 2 is a perspective view from the bottom side of the container shown in Figure 1;

Figure 3 is a sectional view taken substantially along the line 3—3 of Figure 1, showing the key in the keyway for stabilizing the position of the tank;

Figure 4 is a sectional view similar to that of Figure 3, showing a modification in the construction of the keyway;

Figure 5 is a sectional view similar to that of Figure 3, showing a further modification in the key and keyway construction; and Figure 6 is an enlarged sectional elevational view through the center of the tank assembly shown in Figure 1.

In accordance with the practice of this invention, means are employed with an independent cargo container on board ship to stabilize the top and bottom of the container for maintaining full and complete control of the movements thereof with respect to the remainder of the ship structure while, at the same time, permitting free expansion and contraction of the container responsive to the various temperature conditions existing in use. Briefly described, the desired relationship is achieved in an efficient and economical manner by the use of cable means interconnecting the top of the tank with the ship's structure to control and stabilize the tops of the containers, and by the use of key and slot means interconnecting the bottom of the tank and the insulating floor on which it rests to control and stabilize the bottom end portions of the containers, thereby to maintain a predetermined relationship between the ship and the containers therein notwithstanding the temperature differentials existing in the elements involved and the shifting of load in response to the uncontrolled movements of the ship.

In the drawings, the tank 10 is schematically represented as a rectangularly-shaped container having side walls 12 and 14, a front wall 16, and a back wall 18, a bottom wall 20 and a top wall 22. Suitable openings will be provided in the top wall for access to the interior of the tank for introducing various pipings through which the cold liquid may be caused to flow into and out of the tank, as well as for venting vapors generated from the liquid in the tank responsive to the absorption of heat. Thermal insulating material 24 lines the outside of the tank all around to minimize heat transfer and to separate the outer walls of the tank from the inner wall 26 defining the hold of the ship in which the tank is located.

Referring now to the means cooperating with the upper portion of each of the tanks centering and stabilizing each tank and for maintaining proper alignment lengthwise and crosswise of the ship without restricting expansions and contractions in any direction, there is provided a plurality of cables 30 which are arranged to extend crosswise and lengthwise over the top of each tank. The larger group of the cables 32 extends across the top of the tank substantially crosswise of the ship to stabilize the tank against uncontrolled movement during roll of the ship. A lesser number of cables 34 extends across the top of the tank substantially lengthwise of the ship to stabilize the tank during pitching of the ship.

The cables, in laterally spaced apart relation, extend angularly upwardly at a low incline from their lower ends attached to ears 36 fixed to the top wall 22 of the tank to their upper ends secured to brackets 38 fixed to a part of the frame structure 40 of the ship.

While it will be sufficient if the lower ends of the cables 30 are attached to the top walls 22 of each of the tanks 10 at any portion between the center and the outer edges of the tanks, it is preferred to secure the cables at their ends to a portion of the tank wall spaced a predetermined distance beyond the center. For example, unless means are provided automatically to increase or decrease the lengths of the cables 30, the cables, when secured to the center portion of the tanks, will become unduly stressed when the tanks are reduced in height because of contraction and they will become undesirably slack when the tanks are increased in height because of expansions. This is because the point of attachment to the tank will travel vertically in a straight line with the tank while the ends of the cables will tend to swing about an arc 42 having its center at the point of attachment between the upper ends of the cables and the ship's frame. The difference X between the vertical position and the corresponding position on the arc will represent the deficiency in length or excess in length of the cables which will operate to cause unbalance and strain conditions, unless compensated.

In accordance with the preferred practice of this invention, with the tanks held in their centered positions, that is, with the centers stabilized, the described difficulty can be effectively compensated by locating the point of attachment between the cables and the top of the tank a distance Y beyond the center of the tank calculated so that the amount of expansion or contraction which takes place through the distance Y will substantially correspond with the distance X to the end that, upon expansions or contractions, the point of attachment by the cables at the top of the tank will substantially follow the arm 42 thereby to minimize the development of stress or strain conditions and avoid unbalance of the tank.

The amount of expansion and contraction of the cables 30 should be subtracted from the distance X or added to the expansion or contaction that takes place through the distance Y in determining the distance Y from the center. This factor is of lesser importance because much of the cable will be at about ambient temperature.

The angular relationship of the cables in the horizontal plane is unimportant although it is expedient to arrange the cables perpendicularly to each other to extend lengthwise and crosswise of the tanks and ship. The vertical angle can also be varied but greatest stability with less strain can be achieved by the use of low angles in the range of 0 to 30 degrees. For purposes of greater flexibility, the cables 30 may be spring loaded to provide a predetermined tension while permitting greater flexibility in the effective lengths of the cables, thereby to minimize the importance of the spaced relationships defined; however, it is preferred to operate without such intervening spring elements in the cable systems. Various means, such as the turnbuckle means 44, may be employed for taking up any slack in the cables and to tighten the cables to the desired loading in the assembled relation.

The cables themselves should be made of a material which has as low thermal conductivity as possible in order to minimize the loss of cold along the cables. For this purpose, it is desirable to employ a metal such as stainless steel or the like for the cables. The angle which the cables form with the top wall 22 will depend somewhat upon the thickness of the insulation, since it is desirable to have the cables pass through the insulation to the ship's structure 40. In any event, it is desirable to keep the angle at a minimum within the designed conditions which obtain in the overall layout of the ship and containers.

Thus, the cables will operate under constant controlled tension to center the top portion of the tanks in maintaining proper alignment within the insulation in the ship's structure. To complete the control, independent means are provided for maintaining proper alignment and to stabilize the bottom portion of the tank, as will hereinafter be described.

In the preferred practice of this invention, the bottom wall 20 of each of the tanks is formed with keys 46 and 48 extending downwardly from the bottom side of the tank along lines radiating from the center and extending in at least two different directions, preferably in directions crosswise and lengthwise of the tank and ship, as illustrated in Figure 2. These keys 46 and 48 are adapted slidably to be received in fitting relation within aligned keyways 50 and 52 respectively formed in the underlying insulation layer 54 upon which the tanks rest when in proper position for use. Thus, when expansion and contraction occur in the tank to change its dimensional characteristics, the one set of keys operative in the keyways will prevent shifting movement of the tank from one side or the other of the centered position, while the other group of keys and keyways will prevent movement of the bottom portion of the tank in the other direction from the center.

In the assembly described, it is important to align the keys and keyways substantially radially from the center, otherwise any contraction in the tanks will tend to displace the tanks from their centered position or otherwise will set up forces which will cause deterioration of the insulation supporting the tank in the desired spaced relation from the ship's walls or hull structure. If a plurality of laterally spaced or lengthwise spaced keys and keyways were employed, the amount of contraction in the tank would vary with the distance from the center of the tank, with the result that at least some of the keys or keyways would be required to give, thereby to place the tank or insulation in danger.

By way of modification, a pair of keys 56 and 58 in closely spaced apart parallel relation may be provided to extend crosswise or lengthwise from the center portion of the tank to provide a keyway 60 therebetween adapted to receive a key 62 provided in the top wall of the insulated floor 54 upon which the tank rests for supporting the tank in the desired aligned relationship within the ship. Many other modifications of keys and keyways will be apparent to those skilled in the art.

The keyways maintain proper alignment of the independent cargo containers and preserve the location of the containers relative to the ship. Such a key and keyway system running lengthwise of the tank prevents the tank from becoming displaced out of alignment when the ship rolls, while the key and keyway system running crosswise of the tank will prevent the cargo container from being displaced out of alignment when the ship pitches.

The keys are preferably constructed from material having a low thermal conductivity thereby to minimize the leakage of heat from the tanks. The material used in the keys and keyways should be characterized by sufficient structural strength to withstand the existing forces generated by the ship's motion in a manner to maintain the independent cargo container in proper alignment. It has been found that the insulation layer in which the keys or keyways are formed may preferably be fabricated of materials having relatively high structural strength, such as balsa wood, and which may be further strengthened by the use of a top ply 64 of a hard wood, plywood, or other structurally strong, relatively good heat-insulating material.

In the construction of the keys or keyways in the insulation layer 54, it is desirable to avoid the formation of cracks or other passages through which the cold liquid might escape into engagement with the supporting structure of the ship, since the steel plates of which the ship is formed are generally incapable of standing up under such cold temperatures. Thus, when the insulation is formed of a rigid material of structural strength, such as is preferred in supporting the tank, it is desirable to provide sealing elements of fluid impervious material as a lining about the key or keyway in the insulating layer, as indicated by the plywood lamina 66.

To avoid the formation of cracks or crevices in the insulation, one practice which may be adopted is to route out the keyway from the laid flooring of insulation material after the proper location of the keyway has been determined, as by a template taken from the bottom of the tank. The formed keyway may be lined with plywood 66 or other fluid impervious material. Instead, the area in which the keyway will be located may be built up of boards 68 or other fluid impervious, high strength material laminated together to a depth greater than the depth of the keyway so that the keyway may be routed out without penetrating through the build-up layers of fluid impervious, reinforcing material, thereby to provide a keyway of high strength without cracks or crevices through which the fluid may pass and without penetrating into the softer and more porous insulating layer.

In operation, the elongate radially extending keys in one of the adjacent surfaces of the tank bottom and floor top is slidably received in the aligned, elongate keyways in the other surface to permit expansions and contractions of the tank by way of radiations from the center, thereby to maintain the tank properly centered within the ship.

It will be apparent from the foregoing that cargo containers of the type described may be incorporated into the hull of a ship or other means of transportation in which rolling or pitching movements might be encountered without loss in control or stability of the tank and without permitting uncontrolled displacement thereof from proper alignment in the ship. The combination of cables suspending the top portion of the tank from the ship and keys and keyways for controlling movements at the bottom portion of the tank, makes possible the shipping of large quantities of tanks of large capacity notwithstanding the fact that the liquids are at a temperature so low that the tank containing the liquids cannot become an integral part of the ship's structure.

It will be understood that numerous changes may be made in the details of construction, arrangement and operation without departing from the spirit of the invention, especially as defined in the following claims.

We claim:

1. In the transportation of an insulated container on a conveyance means subject to angular movement, means for stabilizing the location of the container on the transporting means while leaving the container free for expansions and contractions comprising means in the upper end of the container for stabilizing its position on the conveyance means comprising cables extending lengthwise and crosswise of at least one-half of the top of the container and secured at one of their ends to the top of the container and at their other ends to the frame of the conveyance means at a level above the top of the tank, and means in the lower end of the container for stabilizing its position on the conveyance means comprising keys extending radially angularly from the center of the container in one of the adjacent surfaces including the bottom of the tank and the floor upon which it rests on the conveyance means and correspondingly located keyways in the other of the surfaces slidably to receive the keys to interconnect the surfaces along lines extending radially from the center of the tank thereby to permit expansions and contractions in any direction without movement of the tank from its centered position.

2. In the transportation of a container on a ship subject to rolling and pitching, means for stabilizing the location of the container on the ship while leaving the container free for expansion and contraction comprising means in the upper end of the container for stabilizing its position on the ship comprising cables extending lengthwise and crosswise of the ship over at least one-half of the top of the container and secured at one of their ends to the top of the container and at the other of their ends to the framework of the ship at a level above the top of the container, and means at the lower end of the container for stabilizing its position on the ship comprising keys extending angularly outwardly radially from the center of the tank in one of the adjacent surfaces including the bottom of the tank and the floor upon which it rests in the ship and correspondingly located keyways in the other of the surfaces dimensioned slidably to receive the keys to interconnect the surfaces along lines extending radially from the center of the tank thereby to permit expansions and contractions in any direction without movement of the tank from its centered position.

3. In the assembly of a container of large capacity for holding a low temperature liquid at atmospheric pressure onboard ship for transportation and having insulating means separating the container from the wall structure of the ship, means for mounting the container independently of the ship to permit expansions and contractions without loss in stability and alignment of the container in the ship comprising means at the upper end of the container for stabilizing its position on the ship including cables extending angularly horizontally with one of their ends secured to the top of the tank and the other of their ends secured to the framework of the ship at a level above the top of the tank, and means at the lower end of the container for stabilizing its position in the ship including keys extending radially from the center of the tank from one of the adjacent surfaces including the bottom of the tank and the insulating floor upon which it rests and correspondingly located keyways in the other of the surfaces slidably to receive the keys to interconnect the surfaces along lines extending radially from the center of the tank thereby to permit expansions and contractions of the tank in any direction without displacement from its centered position.

4. An assembly as claimed in claim 3 in which the cables are arranged perpendicularly from each other to extend lengthwise and crosswise of the ship.

5. An assembly as claimed in claim 3 in which the cables extend over at least one-half of the top of the container.

6. An assembly as claimed in claim 3 in which the top of the tank is horizontally disposed and in which the cables are disposed at an angle between 0 and 30 degrees with the top of the tank.

7. An assembly as claimed in claim 3 in which the keys extend downwardly from the bottom wall of the tank along lines which radiate from its center and in which the keyways are located in corresponding position in the insulating floor supporting the tank slidably to receive the keys therein for relative radial movement in the direction toward and away from the center responsive to contractions and expansions respectively of the tank.

8. An assembly as claimed in claim 3 in which the insulation adjacent the bottom side of the tank is formed of a material of low heat conductivity having sufficient strength to support the tank and in which a top ply of a structurally strong, fluid impervious material lines the top surface of the insulating floor to impart greater strength to the interconnecting key and keyway assembly.

9. An assembly as claimed in claim 8 in which the floor portion in which the keyway is formed comprises a structurally strong, fluid impervious material to a depth greater than the depth of the keyway.

References Cited in the file of this patent

UNITED STATES PATENTS

| 2,229,081 | Hansen et al. | Jan. 21, 1941 |
| 2,800,249 | Beckwith | July 23, 1957 |

FOREIGN PATENTS

| 76,805 | Denmark | Dec. 7, 1953 |
| 667,215 | Great Britain | Feb. 27, 1952 |